March 25, 1969 E. A. ROBINSON 3,435,253

SYMMETRICAL CLIPPER

Filed Jan. 19, 1966

INVENTOR.
EUGENE A. ROBINSON
BY Mac Moody
ATTORNEY 3,435,253
Patented Mar. 25, 1969

3,435,253
SYMMETRICAL CLIPPER

Eugene A. Robinson, Cedar Rapids, Iowa, assignor to Collins Radio Company, Cedar Rapids, Iowa, a corporation of Iowa Filed Jan. 19, 1966, Ser. No. 521,743
Int. Cl. H03k 5/08
U.S. Cl. 307—237 5 Claims

ABSTRACT OF THE DISCLOSURE

A clipping circuit for use with a phase reversing circuit, that may also be an amplifier, that uses a pair of diodes with like electrodes signal circuit connected to the input and output of the phase reversing circuit and with the other electrodes of the pair of diodes interconnected by a potentiometer having a slidable wiper connected to a single reference voltage source whereby adjustment of the wiper is such that clipping adjustment of one-half of the signal cycles into the phase reversing circuit is varied simultaneously with opposite adjustment varying of clipping of the other half of the signal cycle at the output of the phase reversing circuit and with this adjustment including a symmetrical clipping position and a range of adjustment in both directions from operational symmetry relative to the clipped output signal.

This invention relates in general to a clipper circuit and in particular to a symmetrical clipper that requires a reference voltage of only one polarity.

It is oftentimes desirable to limit the amplitudes of a varying signal and this may be accomplished by clipping. The present invention utilizes a symmetrical clipping circuit in which a single reference voltage allows clipping of both the positive and negative going cycles of an incoming wave.

An object of this invention is to provide a clipping circuit which sets a first clipping threshold for a signal of a first polarity and which passes the clipped signal through a phase-shifter to reverse its polarity and then clips it at a second threshold.

An object of this invention is to provide a simple and effective clipping circuit.

A feature of this invention is found in the provision for a clipping circuit in which an incoming signal is supplied to a phase reversing means and in which the input and the output of the phase reversing means are connected to clipping means with a reference voltage that allows the levels of clipping to be adjusted.

Further objects, features, and advantages of this invention will become apparent from the following description and claims when read in view of the accompanying drawings, in which:

Figure 1:
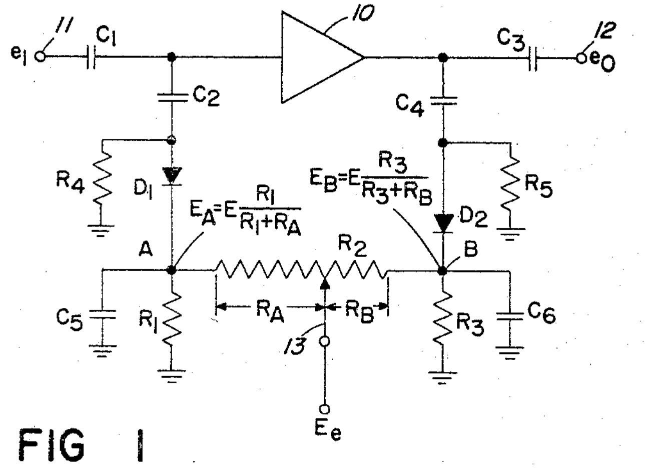
FIGURE 1 is a schematic of the symmetrical clipper of this invention.

FIGURE 1 illustrates an amplifier 10 which includes a 180-degree phase reversal to which is connected an input voltage $e_1$ which is supplied from an input terminal 11 to amplifier 10 through a condenser $C_1$. An output terminal 12 is coupled to the output of the amplifier 10 through coupling condenser $C_3$.

A coupling condenser $C_2$ is connected to the input of the amplifier 10 and to diode $D_1$. A resistor $R_4$ is connected from condenser $C_2$ to ground. The opposite side of diode $D_1$ is connected to a resistor $R_1$ and bypass condenser $C_5$. The other sides of resistor $R_1$ and bypass condenser $C_5$ are connected to ground. The output of the amplifier 10 is connected to a coupling capacitor $C_4$ which has its opposite side connected to diode $D_2$. A resistor $R_5$ is connected between condenser $C_4$ and ground. The other side of $D_2$ is connected to a resistor $R_3$ and a condenser $C_6$ which have their opposite sides connected to ground. A resistor $R_2$ is connected between points A and B between diodes $D_1$ and $D_2$. A variable wiper contact 13 is movable relative to $R_3$ and a reference voltage $E_e$ is connected to wiper contact 13.

Figure 2:
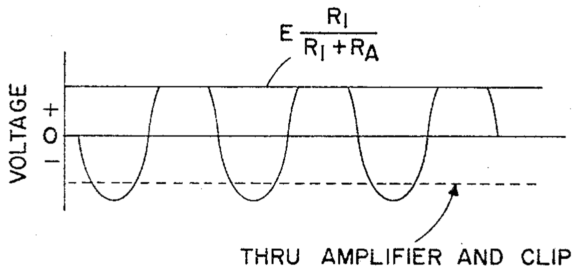
FIGURE 2 is a curve illustrating the clipped output of the clipper.

The adjustment of the wiper contact 13 determines the clipping level of both the positive and negative portions of the incoming signal. With the diodes poled as shown in FIGURE 1 an incoming signal will be clipped as shown in FIGURE 2. When point A is less positive than the voltage developed at the junction of capacitor $C_2$ and diode $D_1$ with positive swings of the input signal, diode $D_1$ will conduct and clipping will occur. This clipping is determined by the adjustment of the wiper contact 13. The voltage at point A is:

$$E_A = E\frac{R_1}{R_1+R_A} \qquad (1)$$

where $R_A$ is the resistance from the wiper contact 13 to the point A.

The signal which has been clipped on the positive cycle will pass through amplifier 10 and will be amplified and inverted in phase. The diode $D_2$ will clip the positive output (initially this was the negative portion) at a level depending upon the setting of the wiper contact 13. The voltage at point B will be:

$$E_B = E\frac{R_3}{R_3+R_B} \qquad (2)$$

where $R_B$ is the resistance from potentiometer wiper 13 to point B.

Due to the gain of amplifier 10, the voltage at point B should be set at approximately the gain of the amplifier times the voltage at point A for symmetrical clipping. If unsymmetrical clipping is desired, the wiper 13 may be moved toward either end of $R_2$ so that the voltage at point B does not equal the voltage at point A multiplied by the gain of the amplifier 10.

It is to be realized, of course, that the polarity of the diodes could be reversed to allow a negative reference voltage instead of the positive reference voltage as shown.

It has also been discovered that the resistors $R_4$ and $R_5$ may be changed to diodes poled opposite respectively, to diodes $D_1$ and $D_2$.

It is seen that this invention provides a symmetrical clipper of simple construction which allows a single reference voltage to be utilized. Although this invention has been described with respect to particular embodiments thereof, it is not to be so limited, as changes and modifications may be made therein which are within the spirit and scope of the invention as defined by the appended claims.

I claim:

1. A clipping circuit including: an input terminal; an output terminal; a phase reversing circuit having input and output connections circuit connected between said input and output terminals; a pair of diodes with like electrodes circuit connected respectively to said input and output connections of said phase reversing circuit; resistive means interconnecting the other electrodes of said pair of diodes; a single reference voltage source connected to said resistive means; and wherein said resistive means is a potentiometer interconnecting the diodes, and with a wiper contact connected to said single reference voltage source to allow simultaneous adjustment of the clipping levels of said pair of diodes one diode clipping level increasing and the other decreasing with movement of the wiper contact and with clipping level increase or decrease for a particular diode determined by the direction of the wiper contact movement.

2. The clipping circuit of claim 1, wherein said resistive means also includes: a first resistor interconnecting the junction of a first diode of said pair of diodes with said potentiometer to ground; and a second resistor interconnecting the junction of a second diode of said pair of diodes with said potentiometer to ground.

3. The clipping circuit of claim 2, wherein a first capacitor is connected in parallel with said first resistor; and a second capacitor is connected in parallel with said second resistor; and with the phase reversing circuit also an amplifier.

4. The clipping circuit of claim 3, wherein a third capacitor is included in the connection between said input terminal and said input connection; a fourth capacitor in the connection between said output connection and said output terminal; a fifth capacitor between said input connection and said first diode; a sixth capacitor between said output connection and said second diode; a third resistor interconnecting the junction of said fifth capacitor and said first diode to ground, and a fourth resistor interconnecting the junction of said sixth capacitor and said second diode to ground.

5. The clipping circuit of claim 4, wherein said single reference voltage source is a positive voltage source, and said first and second diodes are both oriented in the circuit with cathodes toward the positve voltage source and anodes toward the input and output connections, respectively, of the phase reversing circuit.

References Cited

UNITED STATES PATENTS

| | | | |
|---|---|---|---|
| 3,346,742 | 10/1967 | Aniano et al. | 328—150 X |
| 3,205,448 | 9/1965 | Bahns et al. | 307—237 X |
| 2,888,632 | 5/1959 | McManis. | |

ARTHUR GAUSS, *Primary Examiner.*

J. D. FREW, *Assistant Examiner.*

U.S. Cl. X.R.

307—229, 264; 328—142, 171